(12) United States Patent
Zhang et al.

(10) Patent No.: US 6,502,184 B1
(45) Date of Patent: Dec. 31, 2002

(54) METHOD AND APPARATUS FOR PROVIDING A GENERAL PURPOSE STACK

(75) Inventors: Weifeng Zhang, Milpitas, CA (US); Wenbin He, San Jose, CA (US)

(73) Assignee: Phoenix Technologies Ltd., San Jose, CA (US)

( * ) Notice: Subject to any disclaimer, the term of this patent is extended or adjusted under 35 U.S.C. 154(b) by 120 days.

(21) Appl. No.: 09/145,539

(22) Filed: Sep. 2, 1998

(51) Int. Cl.$^7$ .............................................. G06F 15/00
(52) U.S. Cl. ...................................... 712/202
(58) Field of Search ......................... 711/132; 712/202, 712/228, 132, 32

(56) References Cited

PUBLICATIONS

Hamacher et al., *Computer Organization*, pp. 144–147, 1990.*
Hamacher et al., "Computer Organization, Third Edition," McGraw–Hill Publishing Company pp. 317,329, 1990.*
Hamacher et al., *Computer Organization*, McGraw–Hill Publishing Company, 1990, pp. 137–143 and 559.*
Kruse, *Data Structures & Program Design*, Prentice–Hall, Inc., pp. 64–69, 1987.*

* cited by examiner

*Primary Examiner*—John A. Follansbee (57) ABSTRACT

A method and apparatus for providing a stack in a processor-based system. In one embodiment, the apparatus comprises a memory for storing instruction sequences by which the processor-based system is processed; and a processor coupled to the memory that executes the stored instruction sequences, where the processor has a plurality of registers. The stored instruction sequences cause the processor to: (a) determine a condition of occupancy of the plurality of registers; and (b) rearrange the contents of each of the plurality of registers in accordance with a predetermined order.

46 Claims, 5 Drawing Sheets

METHOD AND APPARATUS FOR PROVIDING A GENERAL PURPOSE STACK

BACKGROUND OF THE INVENTION

1. Field of the Invention

The present invention relates generally to processor-based or microcontroller-based systems, and more particularly, to an apparatus and method of providing a general purpose stack using a processor register set.

2. Description of the Related Art

In processor-based systems, read only memories (ROM) are configured to store information that has been written during the manufacturing process, but which cannot be written to during the normal operating process of the system. Random access memories (RAM) store information that can be directly and randomly read or written. The information stored in ROM is non-volatile (i.e., the information is retained when power is turned off), while that stored in RAM is volatile (i.e., information is lost when power is turned off).

Prior to initialization of the operating system, for example, before the power on self test (POST) has been completed, RAM is neither initialized nor configured. Because of this, use of certain features of RAM, like the stack, is not available. As a result, an application program such as application software and/or firmware, including Basic Input/Output System (BIOS) routines, that is executed during power up or before RAM has been initialized and made accessible, has limited applications. For example, such application software cannot utilize stacks to store variables, build lists, or to implement deeply nested procedures. In addition, as memory technology becomes increasingly complicated, BIOS routines for memory detection and configuration becomes increasingly difficult to implement without availability of stacks.

Accordingly, there is a need in the technology for an apparatus and method for overcoming the aforementioned problems. In particular, there is a need for an apparatus and method for enabling applications to utilize stacks prior to the availability and accessibility of RAM in a processor-based or microcontroller-based system.

BRIEF SUMMARY OF THE INVENTION

A method and apparatus for providing a stack in a processor-based system. In one embodiment, the apparatus comprises a memory for storing instruction sequences by which the processor-based system is processed; and a processor coupled to the memory that executes the stored instruction sequences, where the processor has a plurality of registers. The stored instruction sequences cause the processor to: (a) determine a condition of occupancy of the plurality of registers; and (b) rearrange the contents of each of the plurality of registers in accordance with a predetermined order.

BRIEF DESCRIPTION OF THE DRAWINGS

The invention is illustrated by way of example, and not limitation, in the figures. Like reference indicate similar elements.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

Figure 1:
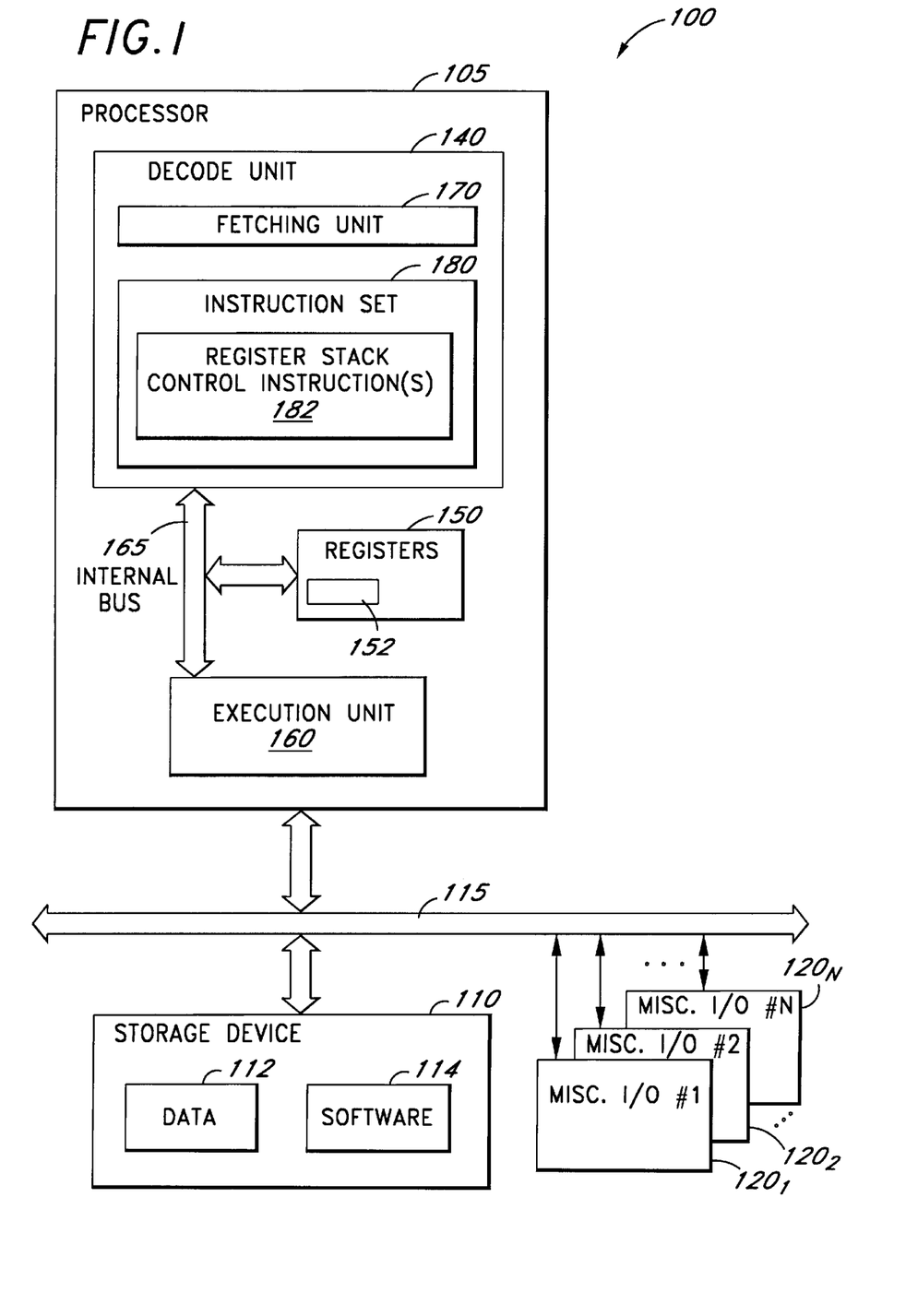
FIG. 1 illustrates an exemplary computer system that implements the present invention.

FIG. 1 illustrates one embodiment of a computer system 100 which implements the principles of the present invention. Computer system 100 comprises a processor 105, a storage device 110, and a bus 115. The processor 105 is coupled to the storage device 110 by the bus 115. The storage device 110 represents one or more mechanisms for storing data. For example, the storage device 110 may include read only memory (ROM), random access memory (RAM), magnetic disk storage mediums, optical storage mediums, flash memory devices and/or other machine readable mediums. In addition, a number of user input/output devices, $102_1$, $120_2$, . . . , $120_n$, such as a keyboard and a display, are also coupled to the bus 115. In addition, other devices such as a network, a TV broadcast signal receiver, a fax/modem, a digitizing unit, a sound unit, and a graphics unit may optionally be coupled to bus 115. The processor 105 represents a central processing unit of any type of architecture, such as multi-threaded CISC, RISC, VLIW, or hybrid architecture. In addition, the processor 105 could be implemented on one or more chips. The bus 115 represents one or more buses (e.g., AGP, PCI, ISA, X-Bus, VESA, etc.) and bridges (also termed as bus controllers). While this embodiment is described in relation to a single processor computer system, the invention could be implemented in a multi-processor computer system.

FIG. 1 also illustrates that the storage device 110 has stored therein data 112 and software 114. Data 112 represents data stored in one or more of the formats described herein. Software 114 represents the necessary code for performing any and/or all of the techniques described with reference to FIGS. 2–5. Of course, the storage device 110 preferably contains additional software (not shown), which is not necessary to understanding the invention.

FIG. 1 additionally illustrates that the processor 105 includes decode unit 140, a set of registers 150, an execution unit 160, and an internal bus 165 for executing instructions. Of course, the processor 105 contains additional circuitry, which is not necessary to understanding the invention. The decode unit 140, registers 150 and execution unit 160 are coupled together by internal bus 165. The registers 150 represent a storage area on processor 105 for storing information, such as control/status information, scalar and/or packed integer data, floating point data, etc. In one embodiment, the registers 150 include a set of registers 152 which are configured to operate as a stack in accordance with the principles of the invention. The decode unit 140 is used for decoding instructions received by processor 105 into control signals and/or micro code entry points. In response to these control signals and/or micro code entry points, the execution unit 160 performs the appropriate operations. The decode unit 140 may be implemented using any number of different mechanisms (e.g., a look-up table, a hardware implementation, a PLA, etc.). While the decoding of the various instructions is represented herein by a series of if/then statements, it is understood that the execution of an instruction does not require a serial processing of these if/then statements. Rather, any mechanism for logically performing this if/then processing is considered to be within the scope of the implementation of the invention.

The decode unit 140 is shown including a fetching unit 170 which fetches instructions, and an instruction set 180 for performing operations on data. In one embodiment, the instruction set 180 includes a register stack control instruction(s) 182 provided in accordance with the present invention. In one embodiment, the register stack control instructions 182 include: a register stack push instruction(s) 184, and a register stack pop instruction(s) 186 provided in accordance with the present invention. One example of the register stack push instruction(s) 184 includes a MMPUSH instruction which operates to move the contents of a target storage into one element of a stack implemented within the processor registers. A second example of the register stack pop instruction 182 includes an MMPOP instruction 186 that moves the contents of one element of a stack implemented within the processor registers, to a target storage. The location of the storage area (such as the target storage) used for storing data transferred to or from the stack is not critical. For example, the target storage may be a register within the registers 150, a cache memory (not shown) located within or external to the processor 105 or the storage device 110.

In one embodiment, the MMPUSH and MMPOP instructions may be applied to integer data. In an alternate embodiment, the MMPUSH and MMPOP instructions are applicable to packed floating point data, in which the results of an operation between two sets of numbers having a predetermined number of bits, are stored in a register having the same predetermined number of bits, i.e., the size or configuration of the operand is the same as that of the result register. While certain register stack instructions are herein described for use with a particular type and amount of data, in alternate embodiments, the register stack control operations can support instructions that operate on different types and amounts of data.

In addition to the register stack control instruction(s) 182, processor 105 can include new instructions and/or instructions similar to or the same as those found in existing general purpose processors. For example, in one embodiment the processor 105 supports an instruction set which is compatible with the Intel® Architecture instruction set used by existing processors, such as the Pentium®II processor. Alternative embodiments of the invention may contain more or less, as well as different instructions and still utilize the teachings of the invention.

Figure 2A:
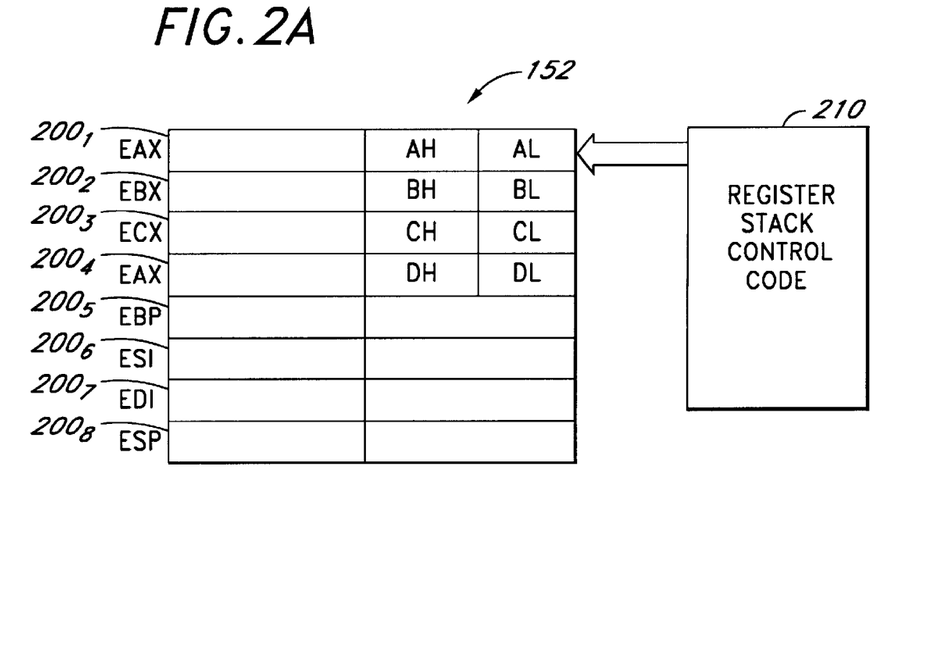
FIG. 2A illustrates one embodiment of the format of a plurality of registers 152 located within the registers 150 of FIG. 1.
Figure 2B:
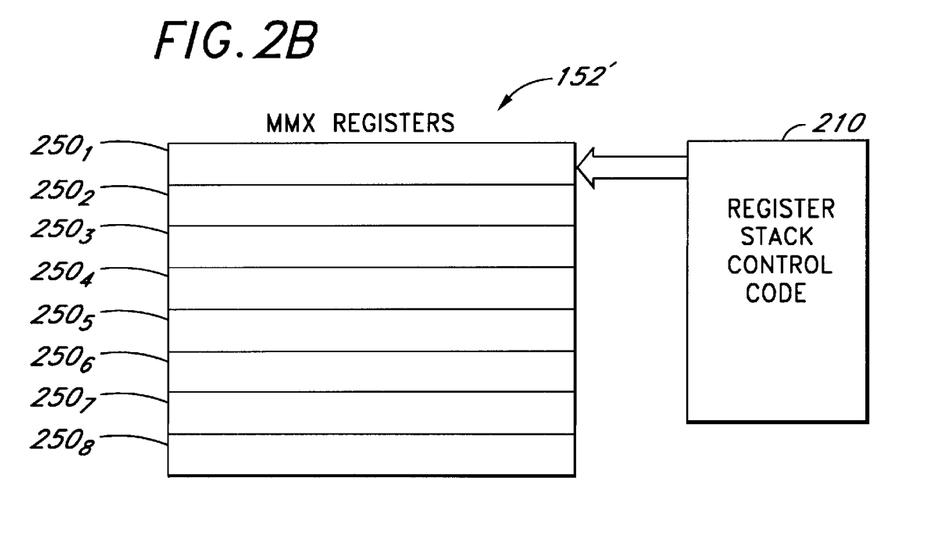
FIG. 2B illustrates an alternate embodiment of the format of the plurality of registers 152 located within the register 150 of FIG. 1.

Although the processor 105 may be implemented using a number of designs as discussed above, for present discussion purposes, the Pentium®II processor of Intel will be referred to. As an example, and not by way of limitation, FIGS. 2A and 2B illustrate the registers of the Pentium®II processor which are used in the discussion of the present invention. As shown in FIG. 2A, the processors each include eight thirty-two bit general registers EAX, EBX, ECX, EDX, EBP, ESI, EDI and ESP $200_1$–$200_8$. The sixteen lower order bits of the EAX, EBX, ECX, EDX registers are independently addressable in eight bit increments as the AH (high), AL (low), BH, BL, CH, CL, DH and DL registers for byte addressing. Use of the registers $200_1$–$200_8$ is controlled by software such as the register stack control code 210, in accordance with the principles of the present invention. In one embodiment, the register stack control code 210 is located in storage device 110. However, it is understood that the register stack control code 220 may be stored in any generally known storage medium.

FIG. 2B illustrates an alternative embodiment of the format of the plurality of registers 152 located within the registers 150 of FIG. 1. In this alternate embodiment, the register 152' may be used in place of the registers 152 of FIG. 2A. The registers 152' include a plurality of Multimedia Extension (MMX) registers $250_1$–$250_8$. In one embodiment, there are eight 64-bit MMX registers $250_1$–$250_8$. Use of the registers $250_1$–$250_8$ may also be controlled by software such as the register stack control code 210, in accordance with the principles of the present invention.

Figure 3A:
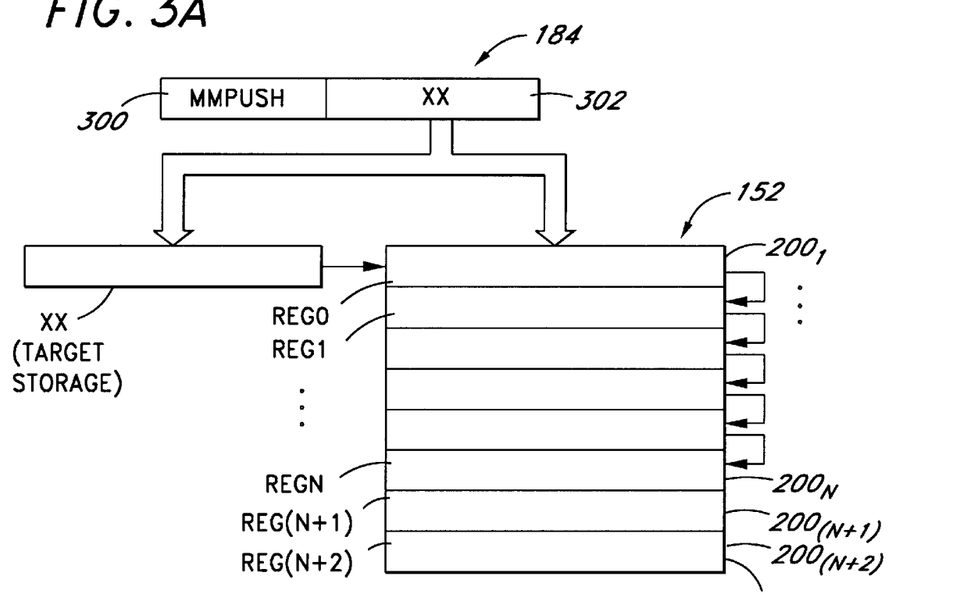
FIG. 3A illustrates the general operation of the register stack push instruction 182 according to one embodiment of the invention.

FIG. 3A illustrates the general operation of the register stack push instruction 184 in accordance with the principles of the present invention. The register stack push instruction 184 comprises an operational code (OP CODE) 300 such as MMPUSH which identifies the operation of the register stack push instruction 184 and an operand 302 which specifies the address of a storage area that the instruction 184 will be operating on.

For example, in the practice of the invention, the register stack push instruction 184 provides the address of the target storage XX that the instruction 184 will be operating on. In one embodiment, upon receipt register stack push instruction 184 first determines if the registers REG0, REG1, . . . , REGN, e.g., $200_1$–$200_N$, allocated for performing stack operations, are full or all occupied. If not, the contents of a preceding register within this stack are moved into a following empty register, and such a transfer is continued until a first one of the set of registers is available to accommodate the contents of the target storage XX. For example, the contents of register REG(N−1) are moved to register REGN; the contents of register REG(N−2) are moved to register REG(N−1), etc.; and the contents of register REG0 are moved to register REG1. The contents of the target storage XX are then moved into register REG0. In one embodiment, register REG(N+1) is used for storing internal status values. In another embodiment, register REG(N+2) is used as a counter register, which provides a value indicative of whether the registers REG0, REG1, . . . , REGN, e.g., $200_1$–$200_N$, allocated for performing stack operations, are occupied.

In an alternate embodiment, the register stack push instruction 184 may operate to transfer the contents of the target storage XX to any one of a plurality of registers, e.g., REGX, where X is 0 to N. This is because any number of the registers may be selected to operate as a stack. In this case, the selected plurality of registers (REGX to REGN) are first examined to determine if they are all occupied. If not, the contents of the register preceding the first unoccupied register are moved into the first unoccupied register. Such data transfer is continued from a preceding register to a following unoccupied register until the register selected for storing the contents of the target storage XX, i.e., the target register REGX, is unoccupied. The contents of the target storage XX can then be transferred into the unoccupied target register, REGX.

Figure 3B:
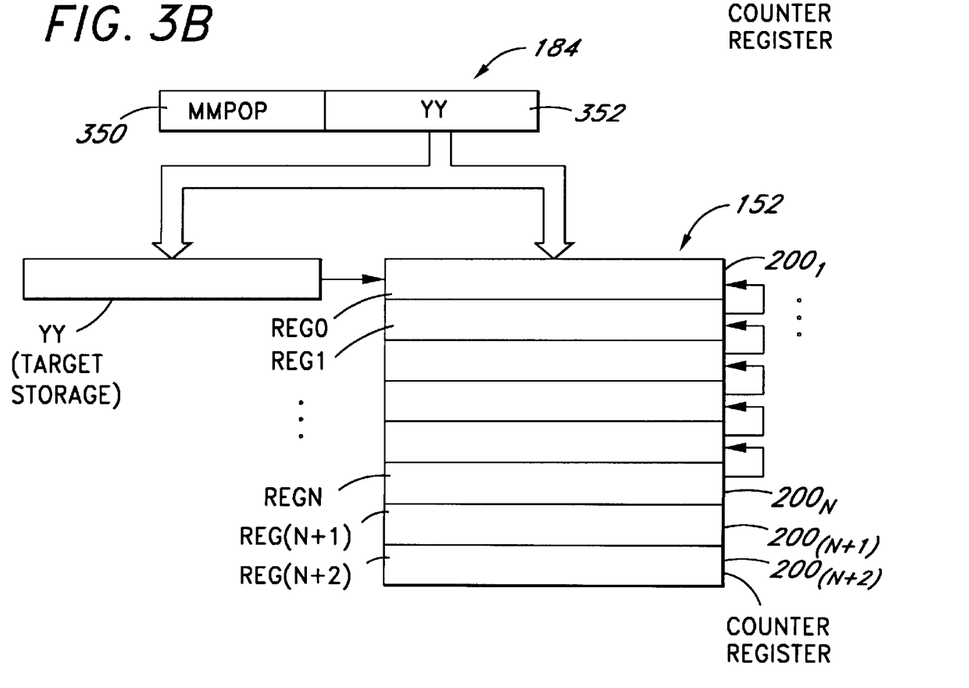
FIG. 3B illustrates the general operation of the register stack pop instruction 184 according to one embodiment of the invention.

FIG. 3B illustrates the general operation of the register stack pop instruction 186 in accordance with the principles of the present invention. The register stack push instruction 186 comprises an operational code (OP CODE) 350 such as MMPOP which identifies the operation of the register stack pop instruction 186 and an operand 352 which specifies the name of a storage which holds an address of the data object that the instruction 186 will be operating on.

In the practice of the invention, the register stack pop instruction 186 provides the address of the target storage YY that the instruction 186 will be operating on. In one embodiment, upon receipt of the register stack pop instruction 186, the processor 105 determines if the registers REG0, REG1, . . . , REGN, e.g., $200_1$–$200_N$, allocated for performing stack operations, are empty. If not, the contents of register REG0 are first moved to the target storage YY. Next, the contents of the first occupied register e.g., REG1, in the stack, are transferred to a preceding register, e.g., REG0. Such transfer is continued until the contents of a last occupied register in the stack, e.g., REGN, have been transferred to a preceding register, e.g., REG(N−1). For example, the contents of register REG1 are moved to register REG0; the contents of register REG2 are moved to register REG(1), etc.; and the contents of register REGN are moved to register REG(N−1). In one embodiment, register REG(N+1) is used for storing internal status values. In another embodiment, register REG(N+2) is used as a counter register, which provides a value indicative of whether the registers REG0, REG1, . . . , REGN, e.g., $200_1$–$200_N$, allocated for performing stack operations, are empty or unoccupied.

In an alternate embodiment, the register stack pop instruction 186 may operate to transfer the contents any one of a plurality of registers, e.g., REGY, where Y is 0 to N, to the target storage YY. This is because any number of the registers may be selected to operate as a stack. In this case, the selected plurality of registers (REGY to REGN) are first examined to determine if they are all unoccupied. If not, the contents of the target register REGY are first transferred into the target storage YY. Next, the contents of the first occupied register e.g., REG(N+1), in the stack are transferred to a preceding register, e.g. REGY. Such transfer is continued from a next occupied register to a preceding unoccupied register until the contents of a last occupied register REGN in the stack have been transferred to a preceding register, e.g. REG(N+1) into the target storage, i.e., the target register (which in this case is REGY), is occupied.

Figure 4:
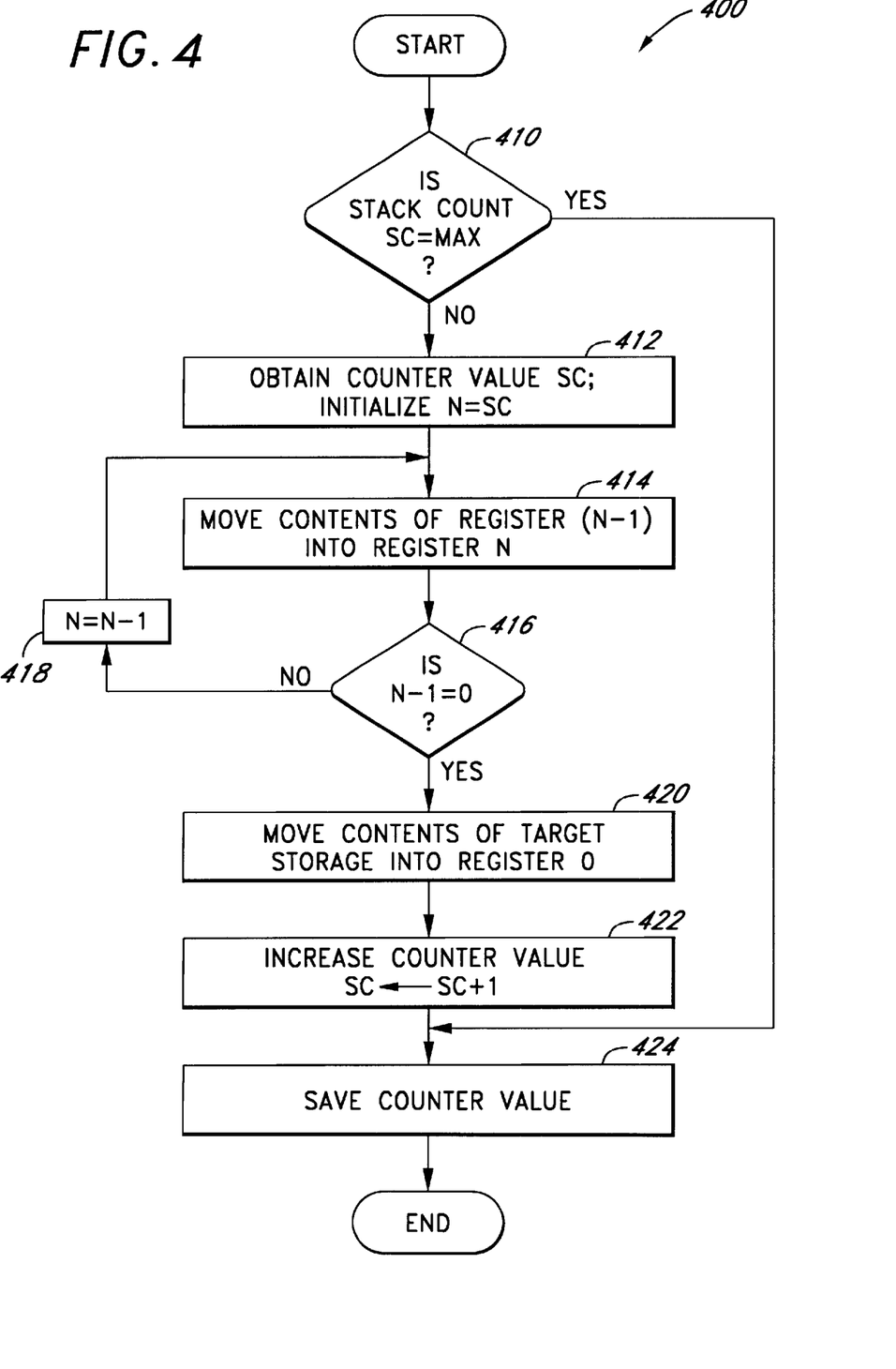
FIG. 4 is a flowchart illustrating one embodiment of the register stack push process of the present invention.

FIG. 4 is a flowchart illustrating one embodiment of the register stack push process of the present invention. Beginning from a start state, the process 400 proceeds to decision block 410, where the contents of the counter register are examined to determine if the stack count SC is a maximum value, i.e., if the stack is full or all occupied. If not, the process 400 proceeds to process block 412, where the process 400 obtains the value SC in the counter register, and the integer N is initialized to the value of SC. Next, the process 400 proceeds to process block 414, where the contents of register REG(N−1) are moved into register REGN. The process 400 then proceeds to decision block 416, where it determines if N−1 is zero. If not, the process proceeds to process block 418, where N is decremented by 1. The process 400 then returns to process block 414. However, if at decision block 416, N−1 is not equal to 0, the process 400 proceeds to process block 420, where the contents of the target storage is moved into register REG0. The process 400 then advances to process block 422, where the stack counter value SC is incremented by 1. The process 400 then proceeds to process block 424, where the counter value SC, is saved. If, at decision block 410, the process 400 determines that the stack count SC is not equal to the maximum value (i.e., the stack is not full), the process 400 proceeds directly to process block 424. Upon completing the process in process block 424, the process 400 terminates.

Figure 5:
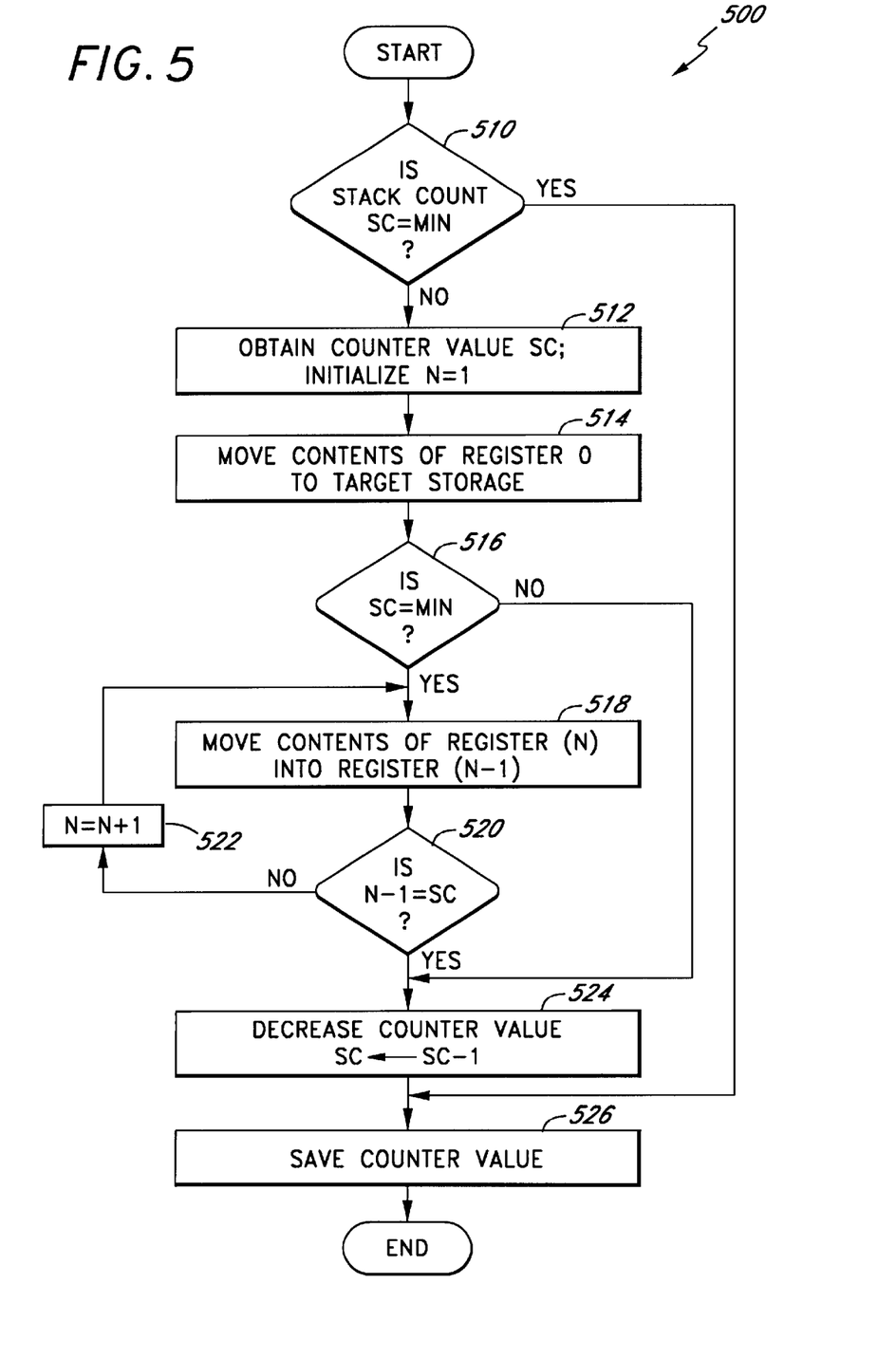
FIG. 5 is a flowchart illustrating one embodiment of the register stack pop process of the present invention.

FIG. 5 is a flowchart illustrating one embodiment of the register stack process of the present invention. Beginning from a start state, the process 500 proceeds to decision block 510, where the contents of the counter register are examined to determine if the stack count SC is a minimum value, i.e., if the stack is empty. If not, the process 500 proceeds to process block 512, where the process 500 obtains the value SC in the counter register, and the integer N is initialized to one. Next, the process 500 proceeds to process block 514, where the contents of register REG0 are moved into the target storage, e.g., YY. The process 500 then proceeds to decision block 516, where it determines if SC is a minimum value. If not, the process 500 proceeds to process block 518, where the contents of register REGN are moved into the register REG(N−1). The process 500 then proceeds to decision block 520, where it determines if N−1=SC. If not, the process 500 proceeds to process block 522, where N is increased by 1. The process 500 then returns to process block 518. However, if at decision block 516, SC is not equal to the minimum value,. the process 500 proceeds directly to process block 524. In addition, if at decision block 520, the process determines that N−1 is 0, the process 500 proceeds directly to process block 524. At process block 524, the process 500 decreases the counter value SC by 1. The process 500 then proceeds to process block 526, where the counter value SC is saved. If, at decision block 510, the process 500 determines that the stack count SC is not equal to the minimum value (i.e., the stack is empty), the process 500 proceeds directly to process block 526. Upon completing the process in process block 526, the process 500 terminates.

Through the use of the present invention, an apparatus and method for enabling applications to utilize stacks prior to availability and accessibility of RAM in a processor system is provided.

While a preferred embodiment has been described, it is to be understood that the invention is not limited to such use. In addition, while the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An apparatus for operating a plurality of internal general purpose registers of a processor as a stack in a processor-based system, prior to initialization of a volatile memory, comprising:

a non-volatile memory for storing one or more instruction sequences by which the processor-based system is processed;

a processor coupled to the non-volatile memory that executes the one or more stored instruction sequences, said processor including a plurality of internal general purpose registers; and, wherein the one or more stored instruction sequences cause the processor, prior to initialization of the volatile memory, to: (a) determine a condition of occupancy of said plurality of internal general purpose registers; and (b) rearrange the contents of one or more of the plurality of internal general purpose registers in accordance with a predetermined order, to operate the plurality of internal general purpose registers as a stack.

2. The apparatus of claim 1, wherein the one or more stored instruction sequences further cause the processor to (c) perform a data transfer based on said condition.

3. The apparatus of claim 2, wherein in (a), the condition of occupancy indicates that if a predetermined number of said plurality of internal general purpose registers is not occupied, then proceeding to perform said data transfer.

4. The apparatus of claim 3, wherein (b) comprises (b.1) moving a content of a last occupied register into a following register; and (b.2) repeating (b.1) until a content of each of occupied register has been moved into a following register.

5. The apparatus of claim 4, wherein (c) comprises transferring a content of a target storage to a first occupied one of said plurality of internal general purpose registers.

6. The apparatus of claim 5, wherein said processor further comprises a counter register that stores a value representative of a number of occupied registers, wherein said one or more stored instruction sequences further cause the processor to increase the value within said counter register after (c).

7. The apparatus of claim 1, wherein said one or more stored instruction sequences further cause the processor to (c) perform a data transfer based on said condition prior to (b).

8. The apparatus of claim 7, wherein in (a) the condition of occupancy indicates that a predetermined number of said plurality of internal general purpose registers are occupied and if so, proceeding with (c).

9. The apparatus of claim 8, wherein (c) comprises moving a content of a first register within said plurality of internal general purpose registers, into a target storage.

10. The apparatus of claim 9, wherein (b) comprises (b.1) moving a content of a first occupied register into a preceding register; (b.2) repeating (b.1) until a content of each of occupied register has been moved into a preceding unoccupied register.

11. The apparatus of claim 10, wherein said processor further comprises a counter register that stores a value representative of a number of unoccupied registers and wherein said stored instruction sequences further cause said processor to decrease the value stored in said counter register after (b) and (c).

12. A processor having a plurality of internal general purpose registers capable of being operated as a stack comprising:
a plurality of internal general purpose registers;
a decoder configured to decode instructions, and
a circuit coupled to said decoder, said circuit in response to a single decoded instruction, prior to initialization of an external volatile memory, to:
(a) determine a condition of occupancy of said plurality of internal general purpose registers; and
(b) rearrange the contents of one or more of the plurality of the internal general purpose registers in accordance with a predetermined order, to operate the plurality of internal general purpose registers as a stack.

13. The processor of claim 12, wherein said circuit to further (c) perform a data transfer based on said condition.

14. The processor of claim 13, wherein in (a), the condition of occupancy indicates that if a predetermined number of said plurality of internal general purpose registers is not occupied, then proceeding to perform said data transfer.

15. The processor of claim 14, wherein (b) comprises (b.1) moving a content of a last occupied register into a following register; and (b.2) repeating (b.1) until a content of each of occupied register has been moved into a following register.

16. The processor of claim 15, wherein (c) comprises transferring a content of a target storage to a first unoccupied one of said plurality of internal general purpose registers.

17. The processor of claim 16, further comprising a counter register that stores a value representative of a number of occupied registers, wherein said single decoded instruction further cause the circuit to increase the value within said counter register after (c).

18. The processor of claim 12, wherein said circuit to further (c) perform a data transfer based on said condition prior to (b).

19. The processor of claim 18, wherein in (a) the condition of occupancy indicates that a predetermined number of said plurality of internal general purpose registers are occupied and if so, proceeding with (c).

20. The processor of claim 19, wherein (c) comprises moving a content of a first register within said plurality of internal general purpose registers, into a target storage.

21. The processor of claim 20, wherein (b) comprises (b.1) moving a content of a first occupied register into a preceding register; (b.2) repeating (b.1) until a content of each of occupied register has been moved into a preceding unoccupied register.

22. The processor of claim 21, further comprising a counter register that stores a value representative of a number of unoccupied registers and wherein said single decoded instruction to further cause said processor to decrease the value stored in said counter register after (b) and (c).

23. The processor of claim 16, wherein an address of said target storage is located in a register specified in the decoded instruction.

24. The processor of claim 20, wherein an address of said target storage is located in a register specified in the decoded instruction.

25. A computer-implemented method for operating a plurality of internal general purpose registers of a processor as a stack prior to initialization of a volatile memory, comprising:
a) decoding a single instruction;
b) in response to said step of decoding the single instruction,
(i) determining a condition of occupancy of the plurality of internal general purpose registers; and
(ii) rearranging the contents of one or more of the plurality of internal general purpose registers in accordance with a predetermined order.

26. The method of claim 25, further comprising (iii) performing a data transfer based on said condition.

27. The method of claim 26, wherein in (i), the condition of occupancy indicates that if a predetermined number of said plurality of internal general purpose registers is not occupied, then proceeding to perform said data transfer.

28. The method of claim 27, wherein (ii) comprises (ii.1) moving a content of a last occupied register into a following register; and (ii.2) repeating (ii.1) until a content of each of occupied register has been moved into a following register.

29. The method of claim 28, wherein (iii) comprises transferring a content of a target storage to a first unoccupied one of said plurality of internal general purpose registers.

30. The method of claim 29, further comprising: providing a counter register that stores a value representative of a number of occupied registers, and incrementing the value within said counter register after (iii).

31. The method of claim 25, further comprising (iii) performing a data transfer based on said condition prior to (ii).

32. The method of claim 31, wherein in (i) the condition of occupancy indicates that a predetermined number of said plurality of internal general purpose registers are occupied and if so, proceeding with (iii).

33. The method of claim 32, wherein (iii) comprises moving a content of a first register within said plurality of internal general purpose registers, into a target storage.

34. The method of claim 33, wherein (ii) comprises (ii.1) moving a content of a first occupied register into a preceding register; (ii.2) repeating (ii.1) until a content of each of occupied register has been moved into a preceding unoccupied register.

35. The method of claim 34, further comprising providing a counter register that stores a value representative of a number of unoccupied registers and decreasing the value stored in said counter register after (ii) and (iii).

36. A computer program product, comprising:
a computer usable medium having computer readable program code embodied therein to operate a plurality of internal general purpose registers of a processor as a stack prior to initialization of a volatile memory, the computer readable program code in said computer program product comprising:
first computer readable program code to determine a condition of occupancy of the plurality of internal general purpose registers; and
second computer readable program code to rearrange the contents of one or more of the plurality of internal registers in accordance with a predetermined order to operate the plurality of internal general purpose registers as a stack.

37. The computer program product of claim 36, further comprising third computer readable program code to perform a data transfer based on said condition.

38. The computer program product of claim 37, wherein said first computer readable program code comprises computer readable program code to perform said data transfer if said condition of occupancy indicates that a predetermined number of said plurality of internal general purpose registers is not occupied.

39. The computer program product of claim 38, wherein said second computer readable program code comprises computer readable program code to (a) move a content of a last occupied register into a following register and (b) repeating (a) until a content of each occupied register has been moved into a following register.

40. The computer program product of claim 39, wherein said third computer readable program code comprises computer readable program code to transfer a content of a target storage to a first unoccupied one of said plurality of internal general purpose registers.

41. The computer program product of claim 40, further comprising fourth computer readable program code to examine a counter register that stores a value representative of a number of occupied registers, and to increment the value within said counter register.

42. The computer program product of claim 36, further comprising third computer readable program code to perform a data transfer based on said condition prior to said second computer readable program code.

43. The computer program product of claim 42, wherein said first computer readable program code comprises computer readable program code to perform said data transfer if said condition of occupancy indicates that a predetermined number of said plurality of internal general purpose registers is not occupied.

44. The computer program product of claim 43, wherein said third computer readable program code comprises computer readable program code to move a content of a first register within said plurality of internal general purpose registers, into a target storage.

45. The computer program product of claim 44, wherein said second computer readable program code comprises computer readable program code to (a) move a content of a first occupied register into a preceding register and (b) repeating (a) until a content of each occupied register has been moved into a preceding unoccupied register.

46. The computer program product of claim 45, further comprising fourth computer readable program code to examine a counter register that stores a value representative of a number of unoccupied registers and to decrease the value stored in said counter register.

* * * * *